(12) United States Patent
Kawada et al.

(10) Patent No.: US 7,230,834 B2
(45) Date of Patent: Jun. 12, 2007

(54) ELECTRONIC EQUIPMENT

(75) Inventors: Yoshiyuki Kawada, Kawagoe (JP);
Katsushi Kawasaki, Kawagoe (JP);
Ken Igarashi, Kawagoe (JP);
Nobumitsu Kasahara, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 379 days.

(21) Appl. No.: 10/687,704

(22) Filed: Oct. 20, 2003

(65) Prior Publication Data

US 2004/0090150 A1 May 13, 2004

Related U.S. Application Data

(62) Division of application No. 10/083,648, filed on Feb. 27, 2002, now Pat. No. 6,678,165.

(30) Foreign Application Priority Data

Mar. 23, 2001 (JP) ............................. P2001-86006

(51) Int. Cl.
*H05K 5/00* (2006.01)
(52) U.S. Cl. ..................... 361/753; 361/754; 361/759
(58) Field of Classification Search ................ 361/741, 361/747, 753–756, 759, 796–802; 403/24, 403/409.1
See application file for complete search history.

(56) References Cited

U.S. PATENT DOCUMENTS

| 4,763,300 | A | | 8/1988 | Yukawa | .................. 273/148 B |
|---|---|---|---|---|---|
| 4,810,203 | A | * | 3/1989 | Komatsu | ..................... 439/326 |
| 4,986,618 | A | * | 1/1991 | Wakatsuki | .................. 312/276 |
| 5,176,523 | A | * | 1/1993 | Lai | .............................. 439/64 |
| 5,657,081 | A | | 8/1997 | Kurahashi | ................... 348/233 |
| 5,781,232 | A | | 7/1998 | Ejima | .......................... 312/276 |
| 5,961,338 | A | | 10/1999 | Wu et al. | .................... 439/326 |
| 6,036,551 | A | * | 3/2000 | Szczesny | .................... 439/701 |
| 6,343,018 | B1 | | 1/2002 | Takeyama et al. | .......... 361/737 |

FOREIGN PATENT DOCUMENTS

| DE | 195 35 678 A1 | 3/1997 |
|---|---|---|
| EP | 0 902 548 A2 | 3/1999 |
| EP | 1 048 527 A1 | 11/2000 |
| JP | 62-114299 | 5/1987 |
| JP | 03-283041 | 12/1991 |
| JP | 06-219220 | 8/1994 |
| JP | 08-045160 | 2/1996 |

* cited by examiner

*Primary Examiner*—Kamand Cuneo
*Assistant Examiner*—Thanh S. Phan
(74) *Attorney, Agent, or Firm*—Drinker Biddle & Reath LLP

(57) ABSTRACT

Electronic equipment comprises a main body, a front panel and a recording medium receiving unit. The front panel is provided movably between an opened position and a closed position on a front side of the main body. A card-type recording medium is to be loaded or unloaded into or from the recording medium receiving unit. The recording medium receiving unit is concealed and inaccessible in case where the front panel is in the closed position. The recording medium receiving unit is displaced along with movement of the front panel so as to be exposed and accessible when the front panel moves from the closed position to the opened position.

3 Claims, 10 Drawing Sheets

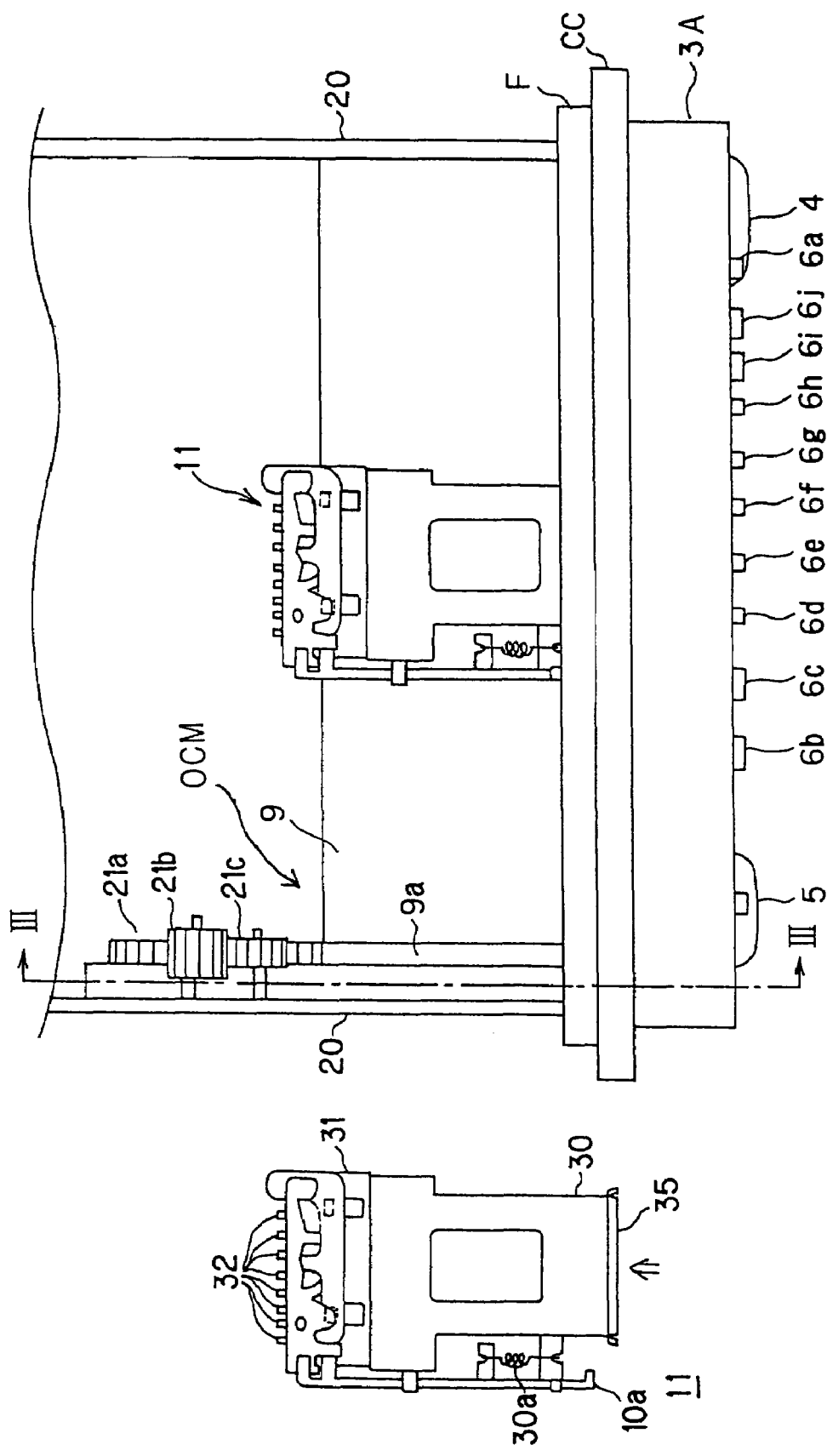

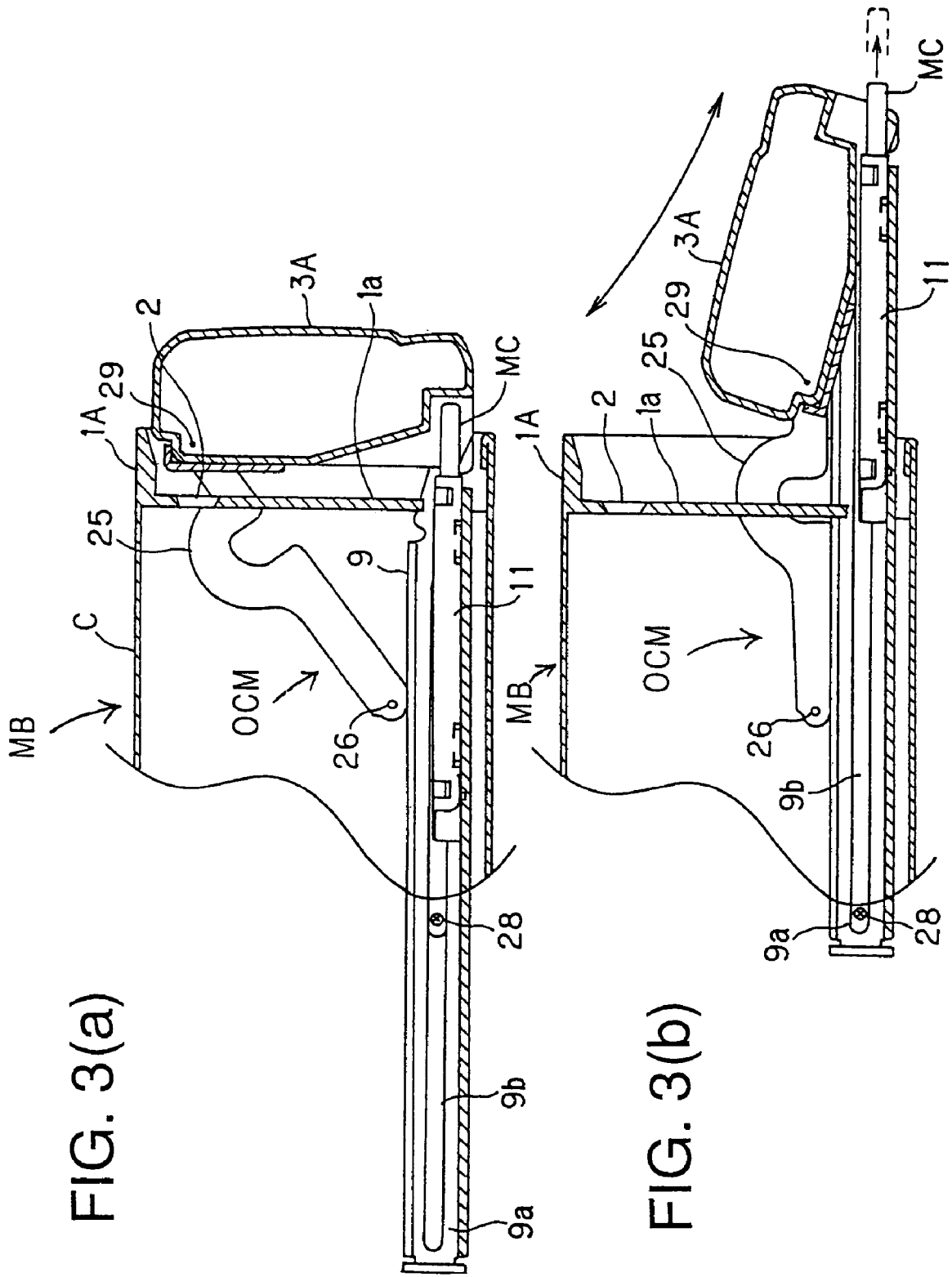

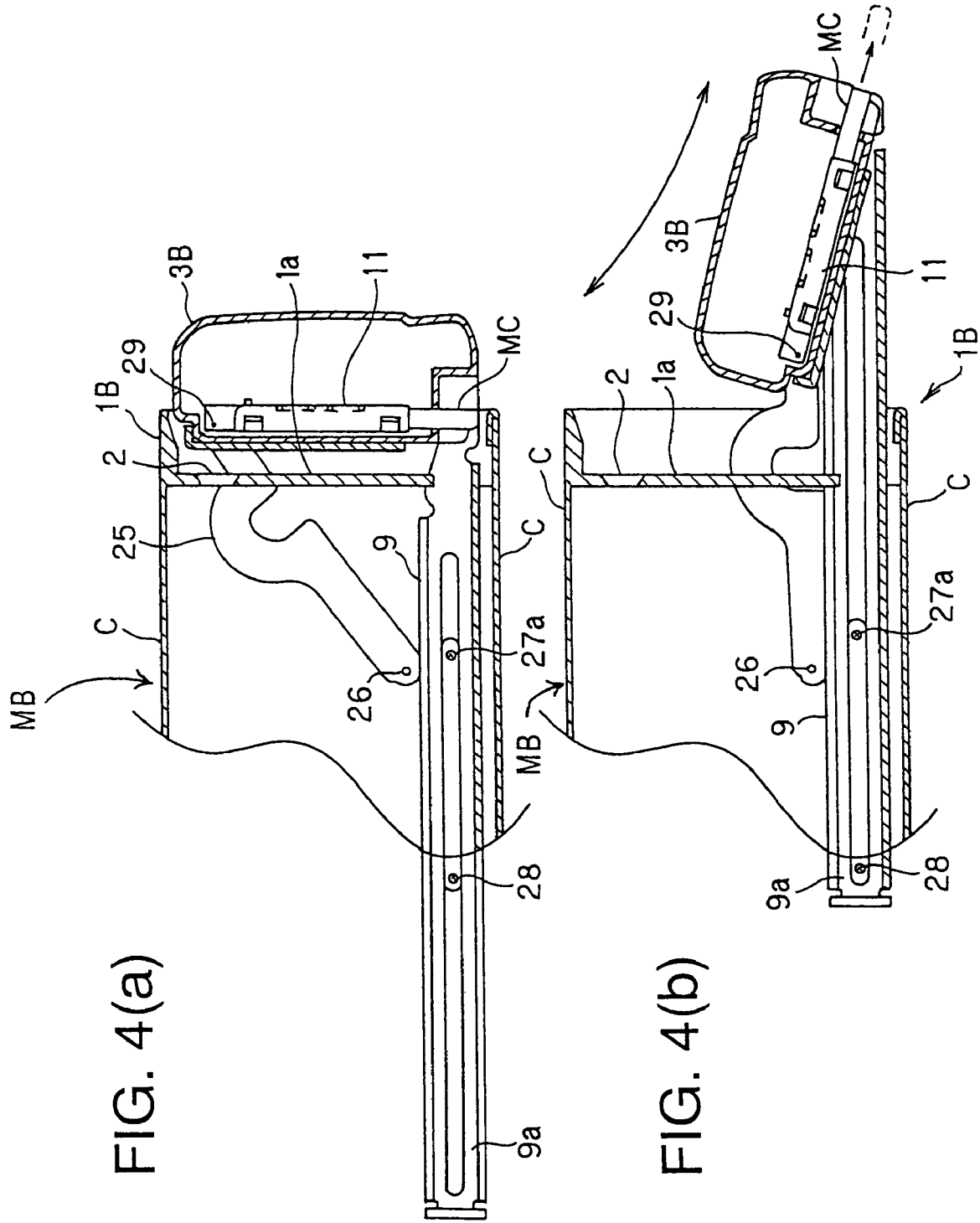

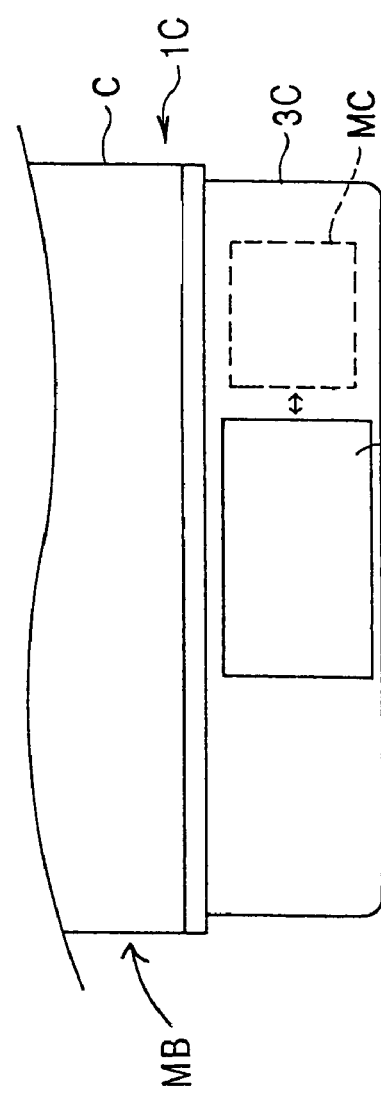
FIG. 5(a)
FIG. 5(b)
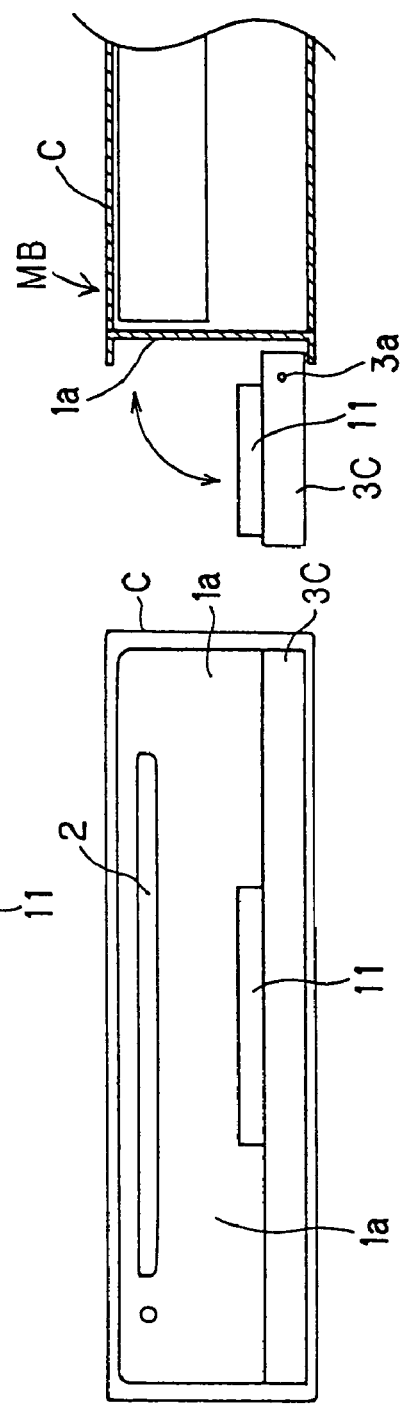
FIG. 5(c)

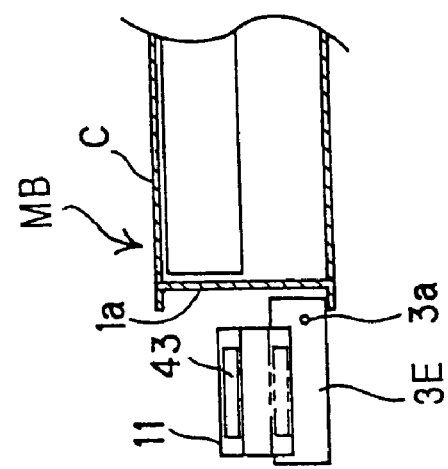
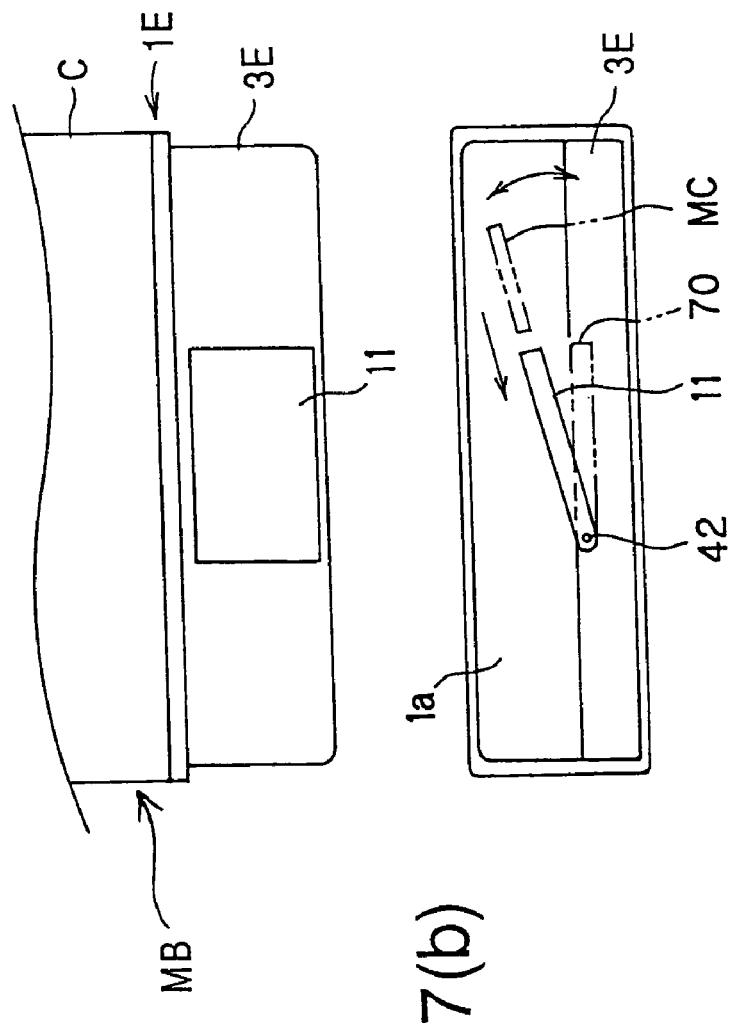

ELECTRONIC EQUIPMENT

The present application is a divisional application of U.S. patent application Ser. No. 10/083,648 filed Feb. 27, 2002, now U.S. Pat. No. 6,678,165 which is hereby incorporated by reference. The present application also claims the benefit of Japanese Patent Application No. 2001-86006 filed in Japan on Mar. 23, 2001.

BACKGROUND OF THE INVENTION

1. Field of the Invention

The present invention relates electronic equipment, and more particularly to electronic equipment having on its front side an openable and closable front panel.

2. Description of the Related Art

Installation of electronic equipment such as an audio device and a navigation device on a vehicle has widely been put into practice.

On the other hand, use of a card-type recording medium having a small size, called a "memory card" has also recently been generalized.

It has recently become possible to store information, which is to be used in the above-mentioned electronic equipment, in the card-type recording medium, so as to provide information sharing between the electronic equipment and a domestic or personal computer, as well as between a plurality of electronic equipment.

With respect to installation of the above-mentioned card-type recording medium on electronic equipment, a casing of the electronic equipment, which has a stationary front panel 101 as shown in FIG. 9, is embedded into a dashboard of a vehicle. As a result, it is necessary to form a slot-shaped insertion opening 106 into or from which the card-type recording medium is to be loaded or unloaded, on any place of the front panel 101.

It is however necessary to provide parts such as an operating dial 102, operating mode buttons 105, an operation displaying unit 104 and selection buttons 103a and 103b, by which the electronic equipment is caused to function, on the above-mentioned front panel 101. Accordingly, the above-mentioned insertion opening 106 must be formed on a place other than the above-mentioned parts such as the operating dial 102. Formation of the insertion opening 106 is however restricted by design which is made when determining arrangement of the parts such as the operating dial 102 on the front panel 101, thus causing problems.

The insertion opening 106 is exposed on the front panel 101, resulting in an increased possibility that the card-type recording medium loaded into the insertion opening 106 may be stolen, thus also causing problems.

There has also been known electronic equipment, which is to be mounted on a vehicle and has an openable or closable front panel. FIG. 10(a) is a partial side view of typical electronic equipment 200 in which a front panel 201 is opened by swinging the front panel 201 around a pivot shaft 206 provided on the lower side of the front panel 201, while moving forward a supporting member 202 to which the pivot shaft 206 is connected. FIG. 10(b) is a partial side view of the other typical electronic equipment 200 in which a front panel 201 is opened by swinging the front panel 201 around a pivot shaft 206.

In either case, there is adopted a structure that an insertion opening 205 for the card-type recording medium MC is formed on an inner wall 204, which is exposed from the front end opening of the casing of the electronic equipment when the front panel 201 is kept in the opened position (i.e., a state as shown in the lower portions of FIGS. 10(a) and 10(b)), and a connector 203 into which the card-type recording medium MC is to be inserted is further provided in a place corresponding to the insertion opening 205.

However, the card-type recording medium MC, which has an extremely small size, is connected to the connector 203 so as to project from the above-mentioned inner wall 204 by a small length. As a result, it is not easy to pull out the card-type recording medium MC from the insertion opening 205, thus causing a problem, even when the front panel 201 is opened as shown in the lower portions of FIGS. 10(a) and 10(b).

SUMMARY OF THE INVENTION

An object of the present invention, which was made to solve the above-mentioned problems, is therefore to provide electronic equipment, which permits to perform easy loading and unloading of a card-type recording medium, reduce the possibility of theft of the card-type recording medium and relieve restriction in design of the front panel.

In order to attain the aforementioned object, the electronic equipment of the first aspect of the present invention comprises a main body; a front panel provided movably between an opened position and a closed position on a front side of the main body; and a recording medium receiving unit into or from which a card-type recording medium is to be loaded or unloaded, wherein the recording medium receiving unit is concealed and inaccessible in case where the front panel is in the closed position; and the recording medium receiving unit is displaced along with movement of the front panel so as to be exposed and accessible in case where the front panel is in the opened position.

According to such features of the first aspect of the present invention, the recording medium receiving unit is displaced so as to be exposed and accessible when the front panel moves from the closed position to the opened position. It is therefore possible to provide technical effects of achieving the easy loading and unloading of the card-type recording medium, and reducing the possibility of theft of such a medium. It is not necessary to form any insertion hole for the card-type recording medium on the front panel, thus relieving restriction in design of the front panel.

In the second aspect of the present invention, the electronic equipment according to the above-described first aspect of the present invention may further comprises an opening and closing mechanism for moving the front panel from the closed position to the opened position so that a front surface thereof faces generally upward, while pushing forward a lower portion of the front panel and lowering an upper portion thereof, and for returning the front panel from the opened position to the closed position. According to such a feature of the second aspect of the present invention, the front panel is kept in the opened position without exposing the rear surface of the front panel. As a result, no special care of the rear surface of the front panel is needed.

In the third aspect of the present invention, there may be adopted, in the above-described second aspect of the present invention, a structure in which the recording medium receiving unit is slidable relative to the casing; and there is provided a sliding mechanism for sliding the recording medium receiving unit between a retracted and inaccessible position and an extended and accessible position, in a same direction as a moving direction of the lower portion of the front panel in synchronization with movement thereof. According to such features of the third aspect of the present invention, the recording medium receiving unit slides to be exposed and accessible when the front panel is moved from the closed position to the opened position. It is therefore possible to carry out more easily a loading or unloading operation of the card-type recording medium.

In the fourth aspect of the present invention, the electric equipment according to the third aspect of the present invention may further comprise a supporting member on which the recording medium receiving unit is mounted, said supporting member being movable in the same direction as the moving direction of the lower portion of the front panel. According to such a feature of the fourth aspect of the present invention, a stable and smooth slide of the recording medium receiving unit can be ensured.

In the fifth aspect of the present invention, the recording medium receiving unit in the above-described second aspect of the present invention may have a slot and be stationarily secured to the front panel so that the slot is exposed outside from a bottom surface of the front panel when the front panel is kept in the opened position. According to such a feature of the fifth aspect of the present invention, the recording medium receiving unit moves together with the front panel, thus permitting to making the structure of the electric equipment simpler.

In the sixth aspect of the present invention, the recording medium receiving unit in the above-described fifth aspect of the present invention may be placed in an inside of the front panel. According to such a feature of the sixth aspect of the present invention, there can be enhanced the appearance of the slot and its surrounding area of the recording medium receiving unit, when the front panel is kept in the opened position so that the slot thereof is exposed and accessible.

In the seventh aspect of the present invention, there may be adopted, in the above-described first aspect of the present invention, a structure in which the front panel is movable to swing between the closed position and the opened position in which a rear surface of the front panel faces generally upward, around a pivot shaft provided on a lower side of the front panel; and the recording medium receiving unit having a slot is stationarily secured to the front panel so that the slot is exposed outside from a bottom surface of the front panel when the front panel is kept in the opened position. According to such features of the seventh aspect of the present invention, it is possible to make the structure of the electric equipment simpler.

In the eighth aspect of the present invention, the recording medium receiving unit in the above-described seventh aspect of the present invention may be mounted on the rear surface of the front panel. According to such a feature of the eighth aspect of the present invention, the further simpler structure of the electric equipment can be ensured.

In the ninth aspect of the present invention, the recording medium receiving unit in the above-described eighth aspect of the present invention may be swingable relative to the front panel. According to such a feature of the ninth aspect of the present invention, it is possible to effectively utilize the area of the front panel, permitting use of the recording medium receiving unit having a relatively large size without enlarging the front panel.

In the tenth aspect of the present invention, the recording medium receiving unit in the above-described ninth aspect of the present invention may be swingable on a plane parallel to the rear surface of the front panel.

In the eleventh aspect of the present invention, the recording medium receiving unit in the above-described ninth aspect of the present invention may be swingable on a plane perpendicular to the rear surface of the front panel.

BRIEF DESCRIPTION OF THE DRAWINGS

FIG. 2(a) is a view illustrating an entire internal structure of the electronic equipment of the first embodiment of the present invention and FIG. 2(b) is a view illustrating a detailed structure of a recording medium receiving unit of the electronic equipment as shown in FIG. 2(a);

FIG. 3(a) is a sectional view of the electronic equipment of the first embodiment of the present invention, illustrating the front panel, which is kept in the closed position and FIG. 3(b) is also a sectional view thereof, illustrating the front panel, which is kept in the opened position;

FIG. 4(a) is a sectional view of the electronic equipment of the second embodiment of the present invention, illustrating the front panel, which is kept in the closed position and FIG. 4(b) is also a sectional view thereof, illustrating the front panel, which is kept in the opened position;

FIG. 5(a) is a partial plan view of the electronic equipment of the third embodiment of the present invention, illustrating the front panel, which is kept in the opened position, FIG. 5(b) is a front view of the electronic equipment as shown in FIG. 5(a) and FIG. 5(c) is a sectional view of the electronic equipment as shown in FIG. 5(a);

FIG. 7(a) is a partial plan view of the electronic equipment of the fifth embodiment of the present invention, illustrating the front panel, which is kept in the opened position, FIG. 7(b) is a front view of the electronic equipment as shown in FIG. 7(a) and FIG. 7(c) is a sectional view of the electronic equipment as shown in FIG. 7(a);

DETAILED DESCRIPTION OF THE PREFERRED EMBODIMENTS

Now, embodiments of electronic equipment of the present invention will be described in detail below with reference to the accompanying drawings. In all the embodiments of the present invention described below, the present invention is applied to the electronic equipment serving as an audio device to be mounted on a vehicle.

I. First Embodiment

Figure 1A:
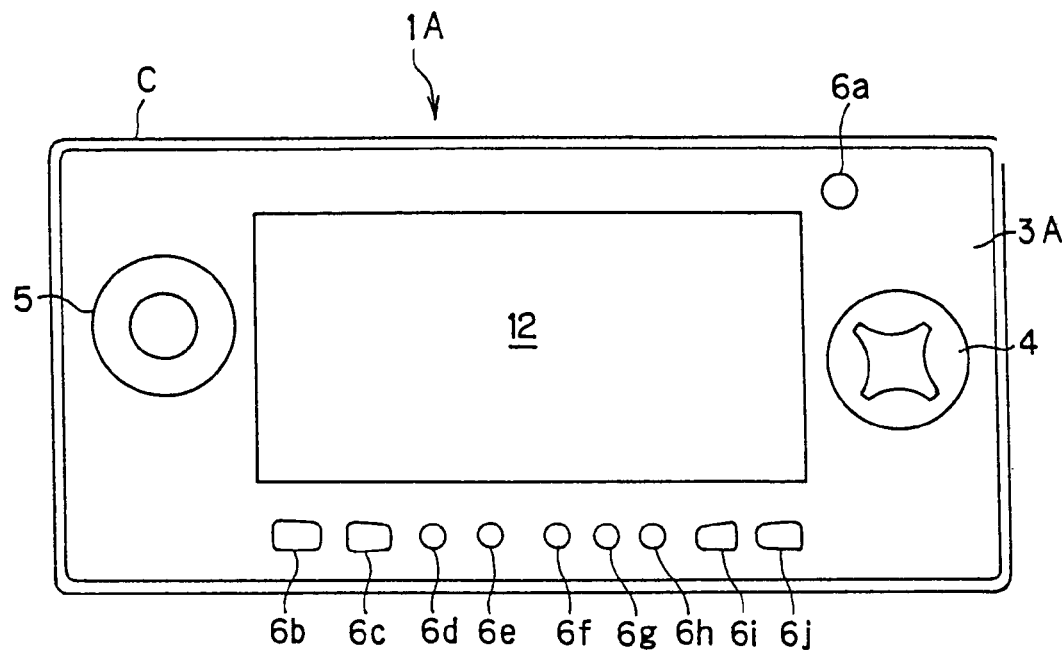
FIG. 1(a) is a front view of electronic equipment of the first embodiment of the present invention, illustrating a front panel, which is kept in the closed position
Figure 1B:
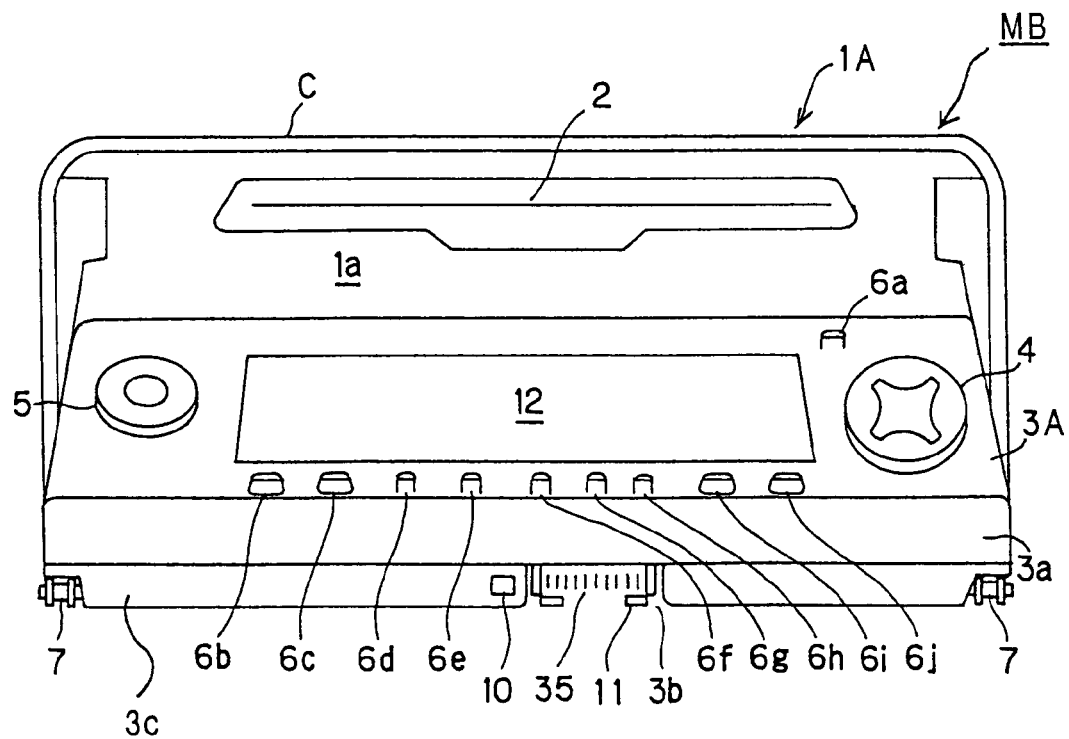
FIG. 1(b) is also a front view thereof, illustrating the front panel, which is kept in the opened position.

Now, the first embodiment of the present invention will be described with reference to FIGS. 1(a) to 3(b). FIGS. 1(a) and 1(b) illustrate the electronic equipment of the first embodiment of the present invention with the front panel kept in the closed and opened positions, respectively, FIGS. 2(a) and 2(b) illustrate the internal structure of the electronic equipment thereof and FIGS. 3(a) and 3(b) illustrate an opening operation of the front panel of the electronic equipment thereof.

As shown in FIGS. 1(a) and 1(b), the electronic equipment 1A of the first embodiment of the present invention includes a main body MB, a front panel 3 and a recording medium receiving unit 11. The main body MB has a casing C and a reproducing unit (not shown) received in the casing C. The casing C has on its front side a flange CC, which defines an opening. The flange CC is provided on its rear surface with a frame F into which the front end portion of the reproducing unit is inserted, as shown in FIG. 2(a), which is a plan view illustrating the electronic equipment 1A having the front panel 3A kept in the closed position, and in which the casing C is removed. The casing C is provided with an inner wall 1a in the vicinity of the opening. The inner wall la has a slot 2 through which a recording medium such as an optical disc can be loaded or unloaded into or from the reproducing unit, respectively.

The front panel 3A is movable between an opened position as shown in FIG. 1(b) and a closed position as shown in FIG. 1(a) so as to open and close the opening of the casing C. An opening and closing operation of the front panel 3A will be described later.

The front panel 3A is provided with a display unit 12 for displaying an operation mode of the electronic equipment 1A, operating members 4 and 5 for setting an appropriate mode of the electronic equipment 1A and operating buttons 6a to 6j. The front panel 3A has its lower opposite sides a pair of pivot shafts 7, 7. In addition, the front panel 3A has a bottom front-side surface 3a and a bottom rear-side surface 3c. The bottom front-side surface 3a and the bottom rear-side surface 3c are concealed in case where the front panel 3A is kept in the closed position as shown in FIG. 1(a), on the one hand, and are exposed in case where the front panel 3A is kept in the opened position as shown in FIG. 1(b). The bottom rear-side surface 3c has in its central portion a recess 3b, through which an insertion hole 35 of the recording medium receiving unit 11 described later can be exposed. The front panel 3A is also provided with an eject button 10, which is slidably exposed from the above-mentioned rear-side surface 3c.

The front panel 3A is movable between the opened position as shown in FIG. 1(b) and the closed position as shown in FIG. 1(a) as described above. When the front panel 3A is kept in the closed position, the front surface thereof stands perpendicularly to the driving direction of a vehicle so as to operate the operating members 4 and 5 and the other buttons 6a to 6j.

More specifically, the electronic equipment 1A includes an opening and closing mechanism for moving the front panel 3A between the opened position and the closed position. The opening and closing mechanism is composed of a supporting member 9, a slidable arm 9a having a rack portion 21a, a gear train including gears 21b, 21c, a driving motor (not shown) and a swing arm 25.

The supporting member 9, which is formed of a rectangular plate, is placed on the bottom surface of the casing C so as to be slidable back and forth relative to the opening of the casing C. The supporting member 9 has opposite front end portions to which the above-mentioned pivot shafts 7, 7 are pivotably connected, respectively.

The slidable arm 9a has an elongated guide slot 9b in its longitudinal direction and the rack portion 21 a at its rear ends. The slidable arm 9a is secured on the one side of the supporting member 9. The casing C has a supporting pin 28 projecting inwardly so that the supporting pin 28 is inserted into the elongated guide slot 9b of the slidable arm 9a. The same supporting mechanism or any other mechanism for slidably supporting the supporting member 9 may be provided on the other side of the supporting member 9. As a result, the slidable arm 9a slides together with the supporting member 9 relative to the casing C.

The gears 21b, 21c are rotatably supported on one of base frames 20, 20 of the casing C. The gear 21c engages not only with the rack portion 21a of the slidable arm 9a, but also with the other gear 21b. The driving motor (not shown) is mounted on the above-mentioned base frame 20 so that a driving gear (not shown) secured on a driving shaft of the driving motor engages with the above-mentioned gear 21b.

The swing arm 25 that is placed on the opposite side to the slidable arm 9a in the casing C, has one end, which is pivotably connected to the casing C by means of a pin 26 (which is a first pivot shaft) as shown in FIGS. 3(a) and 3(b), and the other end, which is pivotably connected to the upper portion of the front panel 3A by means of the other pin 29 (which is a second pivot shaft). The same swing arm 25 may be provided on the other side.

The opening and closing mechanism having the above-described structure moves the front panel 3A from the closed position to the opened position so that the front surface of the front panel 3A faces generally upward, while pushing forward a lower portion of the front panel 3A toward a user of the electronic equipment 1A and lowering an upper portion thereof. As a result, the inner wall 1a of the casing C, which is concealed by means of the front panel that is kept in the closed position, is exposed from the opening of the casing C by moving the front panel 3A from the closed position to the opened position. Accordingly, when the front panel 3A is opened, it is possible to insert an optical disc into the slot 2 provided on the inner wall 1a of the casing C. The optical disc is loaded from the slot 2 so that the reproducing unit reproduces information such as musical information recorded in the optical disc.

As shown in FIG. 2(b), the recording medium receiving unit 11 includes a receiving member 30, a holding mechanism 31, a plurality of terminals 32, an eject lever 10a and a return spring 30a. The receiving member 30 has an insertion hole 35 into or from which a card-type recording medium MC is to be inserted or removed. The holding mechanism 31 holds the card-type recording medium MC inserted into the insertion hole 35 of the receiving member 30, or relieves the holding of the card-type recording medium MC. The terminals 32 electrically connect the card-type recording medium MC to the reproducing unit to output information, which has been recorded in the card-type recording medium MC, into the reproducing unit, on the one hand, and to input information from the reproducing unit into the card-type recording medium MC. The eject lever 10a is slidably mounted on the receiving member 30 in the horizontal direction so that the front end of the eject lever 10a can come into contact with the eject button 10 provided on the front panel 3A, in case where the front panel 3A is kept in the opened position. The eject lever 10a slides between an operation position and an ejection position. The return spring 30a imparts a resilient force for returning the eject lever 10a to the operation position to the eject lever 10a. The recording medium receiving unit 11 having the structure described above is mounted on the central portion of the supporting member 9.

When the card-type recording medium MC is inserted into the receiving member 30 in a direction shown by an arrow in FIG. 2(b), terminals of the card-type recording medium MC come into electric contact with the plurality of terminals 32 of the recording medium receiving unit 11. As a result, there can be carried out execution of outputting information, which has been recorded in the card-type recording medium MC, into the reproducing unit, on the one hand, and of inputting information from the reproducing unit into the card-type recording medium MC.

When the card-type recording medium MC is inserted into the recording medium receiving unit 11 to be kept operable, the eject lever 10 is kept in the operating position by means of the return spring 30a so that the front end of the eject lever 10 moves toward the rear end of the eject button 10 provided on the front panel 3A. Accordingly, if the front panel 3A is kept in the opened position, it is possible to push the eject button 10 as exposed so as to eject the card-type recording medium MC.

Now, description will be given below of operation of the front panel 3A with reference to FIGS. 3(a) and 3(b). FIG. 3(a) is a cross sectional view cut along the line III—III in FIG. 2(a), illustrating a state in which the front panel 3A is kept in the closed position as shown in FIG. 1(a). FIG. 3(b) is a cross sectional view illustrating a state in which the front panel 3A is kept in the opened position as shown in FIG. 1(b).

When the front panel 3A is kept in the closed position as shown in FIG. 3(a), the supporting member 9 and the slidable arm 9a are retracted in the left-hand direction in FIG. 3(a) together with the recording medium receiving unit 11 in which the card-type recording medium MC is received. In such a state, the end of the card-type recording medium MC, which is projected from the receiving member 30 as shown in FIG. 3(a), is concealed by means of the lower portion of the front panel 3A. Accordingly, when the front panel 3A is kept in the closed position, the recording medium receiving unit 11 is inaccessible so that neither insertion of the card-type recording medium MC into the receiving member 30 nor removal of it therefrom can be carried out.

Operation of the driving motor (not shown) causes the gears 21b and 21c to rotate so that the slidable arm 9a, which has the elongated slot 9b into which the supporting pin 28 of the casing C is inserted, slides forward (i.e., in the right-hand direction in FIG. 3(b). The recording medium receiving unit 11 also slides forward together with supporting member 9 and the slidable arm 9a.

The opposite front end portions of the supporting member 9 are pivotably connected to the pivot shafts 7, 7 provided on the lower opposite sides of the front panel 3A, respectively. In addition, the upper portion of the front panel 3A is connected to the casing C by means of the swing arm 25. Accordingly, slide of the supporting member 9 causes the lower portion of the front panel 3A to be pushed forward toward a user of the electronic equipment 1A and the upper portion thereof to be lowered so that the front surface of the front panel 3A faces generally upward, with the result that the front panel 3A moves from the closed position as shown in FIG. 3(a) to the opened position as shown in FIG. 3(b).

When the front panel 3A is kept in the opened position in this manner, the inner wall 1a is exposed from the opening of the casing C and the recording medium receiving unit 11, which is mounted on the supporting member 9, moves forward so that the insertion hole 35 thereof is exposed and accessible through the recess 3b of the front panel 3A. In the light of the mounting structure of the recording medium receiving unit 11, the supporting member 9 serves as a device for sliding the recording medium receiving unit 11 between a retracted and inaccessible position and an extended and accessible position in the same direction as the moving direction of the lower portion of the front panel 3A in synchronization with movement thereof utilizing the opening and closing mechanism.

As a result, the card-type recording medium MC received in the recording medium receiving unit 11 moves forward to a prescribed position in which the recording medium MC can easily be removed from the insertion hole 35. In such a state, a pushing operation of the eject button 10 relieves the hold of the card-type recording medium MC, which is caused by the holding mechanism 31, and moves forward the card-type recording medium MC. The card-type recording medium MC can therefore be pulled out from the recording medium receiving unit 11.

In the above-described first embodiment of the electronic equipment of the present invention, the recording medium receiving unit 11 is concealed and inaccessible in case where the front panel 3A is in the closed position and the recording medium receiving unit 11 is displaced along with movement of the front panel 3A so as to be exposed and accessible when the front panel 3A moves from the closed position to the opened position. It is therefore possible to carry out an easy operation of loading and unloading the card-type recording medium MC and to reduce the possibility of theft of the card-type recording medium MC.

In addition, it is not necessary to form any insertion hole for the card-type recording medium MC on the front surface of the front panel 3A, thus relieving restriction in design of the front panel 3A.

The recording medium receiving unit 11 is mounted on the supporting member 9, which is movable along with the movement of the front panel 3A, thus ensuring a stable and smooth slide of the recording medium receiving unit 11.

II. Second Embodiment

Now, the second embodiment of the present invention will be described with reference to FIGS. 4(a) and 4(b). FIG. 4(a) illustrates the electronic equipment of the second embodiment of the present invention with the front panel 3B kept in the closed position (corresponding to the state as shown in FIG. 1(a)). FIG. 4(b) illustrates the electronic equipment of the second embodiment of the present invention with the front panel 3B kept in the opened position (corresponding to the state as shown in FIG. 1(b)).

The front panel 3B of the second embodiment is provided on its front surface with the same structural components as those of the front panel 3A of the first embodiment. Description of these components is therefore omitted. The front panel 3B is opened and closed by means of the same opening and closing mechanism as in the first embodiment of the present invention. Detailed description of the opening and closing mechanism is also omitted.

In the first embodiment, the recording medium receiving unit 11 for the card-type recording medium MC is mounted on the supporting member 9, which is slidable along with the movement of the front panel 3A. In the second embodiment, the recording medium receiving unit 11 having the slot is stationarily secured in the inside of the front panel 3B so that the slot is placed on the bottom rear-side surface of the front panel 3B. The recording medium receiving unit 11 includes the same components such as a receiving member 30, a holding mechanism 31, a plurality of terminals 32, an eject lever 10a and a return spring 30a. The eject button 10 is also provided on the bottom rear-side surface of the front panel 3B in the same manner as the first embodiment. The front end of the eject lever 10a substantially comes into contact with the eject button 10.

In the second embodiment, the bottom rear-side surface of the front panel 3B is concealed in case where the front panel 3B is kept in the closed position, on the one hand, and is exposed in case where it is kept in the opened position, on the other hand. As a result, the slot of the recording medium receiving unit 11 is concealed and inaccessible in case where the front panel is in the closed position. The recording medium receiving unit 11 is moved or displaced along with the movement of the front panel 3B so that the slot of the recording medium receiving unit 11 is exposed and accessible when the front panel 3B moves from the closed position to the opened position. In such an opened position, the card-type recording medium MC can be loaded into the recording medium receiving unit 11 or unloaded therefrom.

In the above-described second embodiment of the electronic equipment of the present invention, the recording medium receiving unit 11 is stationarily secured in the inside of the front panel 3B so that the slot is exposed outside from the bottom surface of the front panel 3B when the front panel 3B is kept in the opened position. The recording medium receiving unit 11 moves together with the front panel 3B, thus permitting to making the structure of the electric equipment simpler. In addition, there can be enhanced the appearance of the slot and its surrounding area of the recording medium receiving unit 11, when the front panel 3B is kept in the opened position so that the slot thereof is exposed and accessible.

III. Third Embodiment

Now, the third embodiment of the present invention will be described with reference to FIGS. 5(a) to 5(c). FIG. 5(a) is a partial plan view of the electronic equipment of the third embodiment of the present invention, illustrating the front panel, which is kept in the opened position, FIG. 5(b) is a front view of the electronic equipment as shown in FIG. 5(a) and FIG. 5(c) is a sectional view of the electronic equipment as shown in FIG. 5(a).

The front panel 3C of the third embodiment is provided on its front surface with the same structural components as those of the front panel 3A of the first embodiment. Description of these components is therefore omitted.

The opening and closing mechanism in the first and second embodiments described above moves the front panel 3A or 3B from the closed position to the opened position so that the front surface of the front panel 3A or 3B faces generally upward, while pushing forward the lower portion of the front panel 3A or 3B toward a user of the electronic equipment 1A or 1B lowering the upper portion thereof. In the third embodiment, the front panel 3C is movable to swing between the closed position and the opened position in which a rear surface of the front panel 3C faces generally upward, around a pivot shaft 3a provided on a lower side of the front panel 3C as shown in FIG. 5(c).

When the front panel 3C is kept in the opened position, the slot 2 provided on the inner wall 1a of the casing C is exposed. It is therefore possible to insert an optical disc into the slot 2.

The recording medium receiving unit 11 includes the same components as the receiving member 30, the holding mechanism 31, the plurality of terminals 32, the eject lever 10a and the return spring 30a of the recording medium receiving unit 11 of the first embodiment. The recording medium receiving unit 11 is stationarily mounted on the rear surface of the front panel 3C. As shown in FIG. 5(a), a direction along which the card-type recording medium MC is to be inserted is identical to the longitudinal direction of the front panel 3C. However, the present invention is not limited only to such a mounting position of the recording medium receiving unit 11 relative to the front panel 3C. If the length of the recording medium receiving unit 11 in the insertion direction of the card-type recording medium MC is smaller than the lateral length of the rear surface of the front panel 3C, the recording medium receiving unit 11 may be mounted on the rear surface of the front panel 3C so that the direction along which the card-type recording medium MC is to be inserted is perpendicular to the longitudinal direction of the front panel 3C.

The recording medium receiving unit 11 is moved or displaced along with the movement of the front panel 3C so that the slot of the recording medium receiving unit 11 is exposed and accessible when the front panel 3C moves from the closed position to the opened position. In such an opened position, the card-type recording medium MC can be loaded into the recording medium receiving unit 11 or unloaded therefrom.

In the third embodiment, the recording medium receiving unit 11 is stationarily mounted on the rear surface of the front panel 3C. The further simpler structure of the electric equipment can therefore be ensured.

IV. Fourth Embodiment

Now, the fourth embodiment of the present invention will be described with reference to FIGS. 6(a) to 6(c). FIG. 6(a) is a partial plan view of the electronic equipment of the fourth embodiment of the present invention, illustrating the front panel, which is kept in the opened position, FIG. 6(b) is a front view of the electronic equipment as shown in FIG. 6(a) and FIG. 6(c) is a sectional view of the electronic equipment as shown in FIG. 6(a).

The front panel 3D of the fourth embodiment is provided on its front surface with the same structural components as those of the front panel 3A of the first embodiment. Description of these components is therefore omitted.

Figure 6C:
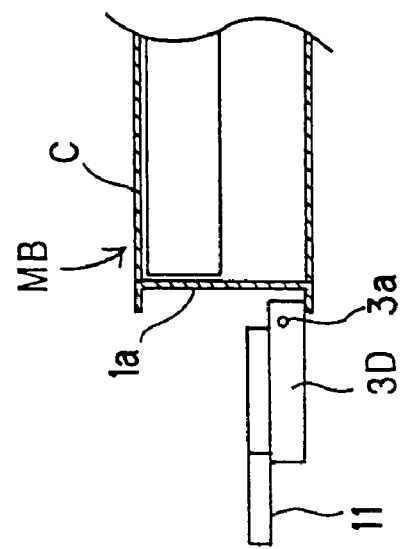
FIG. 6(b) is a front view of the electronic equipment as shown in FIG. 6(a) and FIG. 6(c) is a sectional view of the electronic equipment as shown in FIG. 6(a)
Figure 6A:
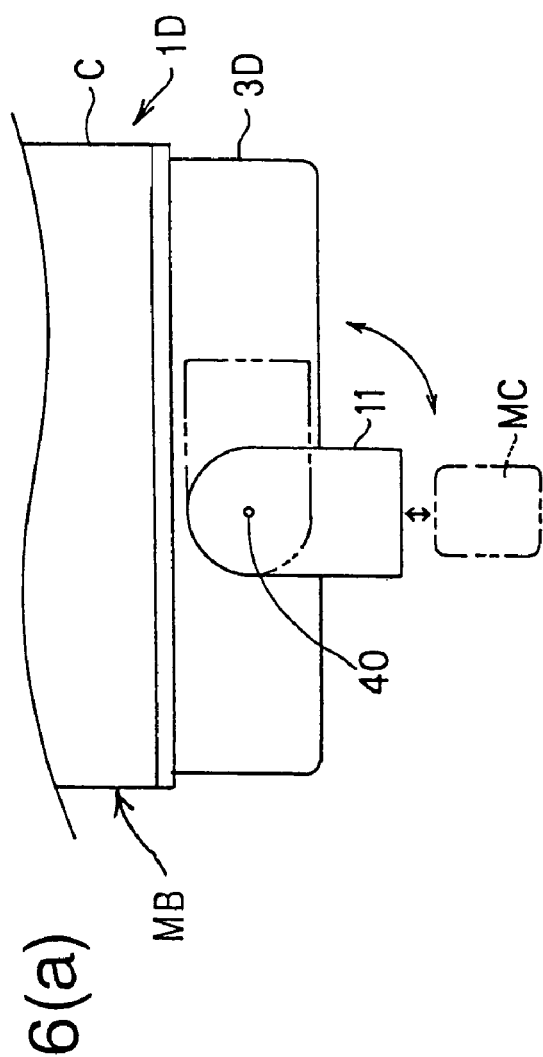
FIG. 6(a) is a partial plan view of the electronic equipment of the fourth embodiment of the present invention, illustrating the front panel, which is kept in the opened position.
Figure 6B:
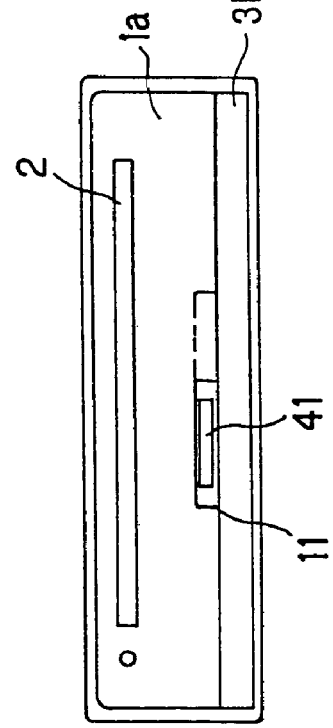

In the fourth embodiment, the front panel 3D is movable to swing between the closed position and the opened position in which a rear surface of the front panel 3D faces generally upward, around a pivot shaft 3a provided on a lower side of the front panel 3D as shown in FIG. 6(c) in the same manner as the third embodiment.

When the front panel 3D is kept in the opened position, the slot 2 provided on the inner wall 1a of the casing C is exposed. It is therefore possible to insert an optical disc into the slot 2.

The recording medium receiving unit 11 includes the same components as the receiving member 30, the holding mechanism 31, the plurality of terminals 32, the eject lever 10a and the return spring 30a of the recording medium receiving unit 11 of the first embodiment. The recording medium receiving unit 11 is mounted on the rear surface of the front panel 3D so as to be swingable by a manual operation around a pivot shaft 40 relative to the front panel on a plane parallel to the rear surface of the front panel 3D. The recording medium receiving unit 11 is therefore swingable between a retracted position in which a direction along which the card-type recording medium MC is to be inserted is identical to the longitudinal direction of the front panel 3D, as shown in two-dot chain lines in FIG. 6(a), on the one hand, and an extended position in which the direction along which the card-type recording medium MC is to be inserted is perpendicular to the longitudinal direction of the front panel 3D so that the slot 41 face toward a user of the electronic equipment, as shown in solid lines in the same figure, on the other hand. In such an extended position, the card-type recording medium MC can be loaded into the recording medium receiving unit 11 or unloaded therefrom. When the recording medium receiving unit 11 is kept in the above-mentioned extended position, the slot 41 approaches the user, thus facilitating a loading or unloading operation of the card-type recording medium MC.

In the fourth embodiment of the present invention, there may be provided a locking mechanism for holding the recording medium receiving unit 11 in the retracted position so as to prevent the recording medium receiving unit 11 from inappropriately swinging when the front panel 3D is opened or closed.

In the fourth embodiment, the recording medium receiving unit 11 is swingable on the plane parallel to the rear surface of the front panel 3D. The loading or unloading operation of the card-type recording medium MC can therefore be facilitated. In addition, it is possible to effectively utilize the area of the front panel 3D, permitting use of the recording medium receiving unit 11 having a relatively large size without enlarging the front panel 3D.

V. Fifth Embodiment

Figure 8A:
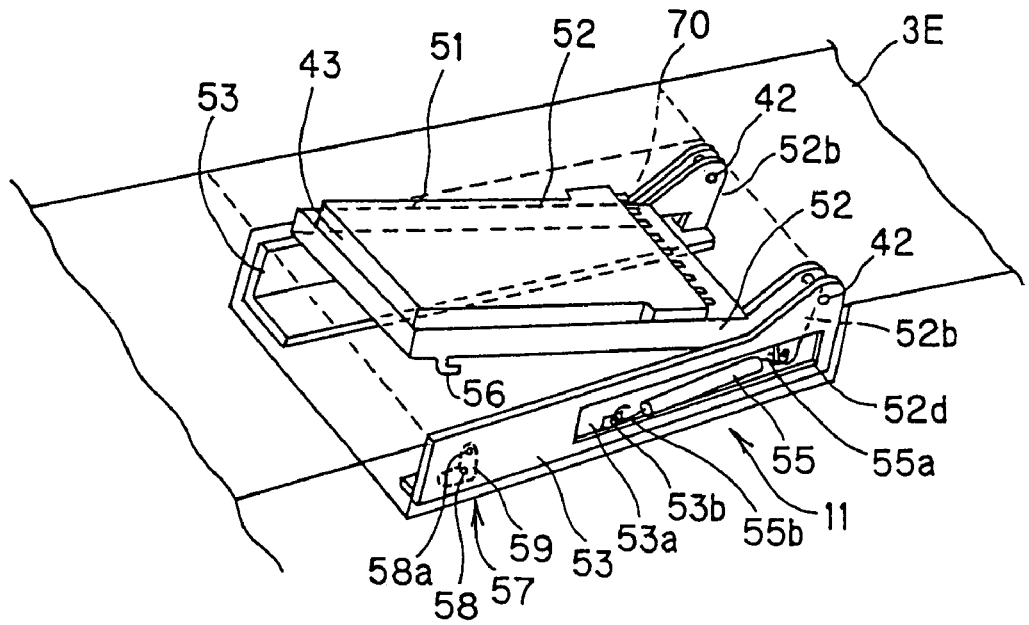
FIG. 8(a) is a perspective view illustrating the recording medium receiving unit of the fifth embodiment of the present invention.
Figure 8B:
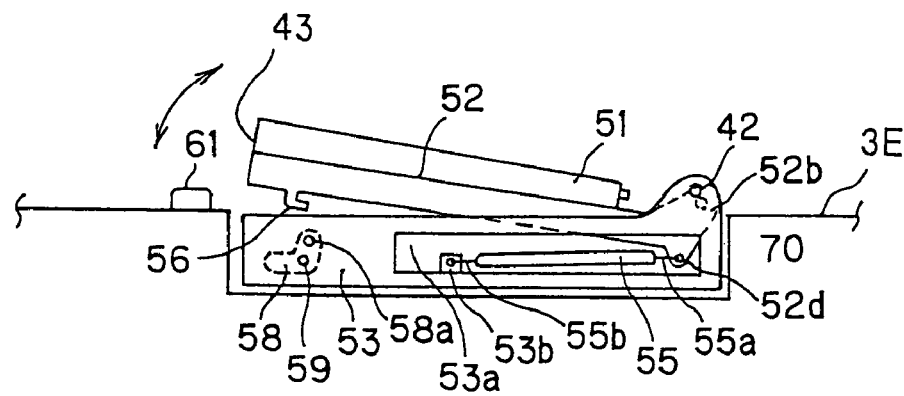
FIG. 8(b) is a rear view illustrating the recording medium receiving unit as shown in FIG. 8(a) and FIG. 8(c) is an enlarged view illustrating a locking mechanism for the recording medium receiving unit as shown in FIG. 8(a)
Figure 8C:
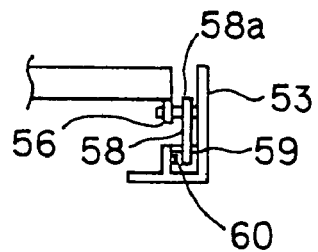
Figure 9:
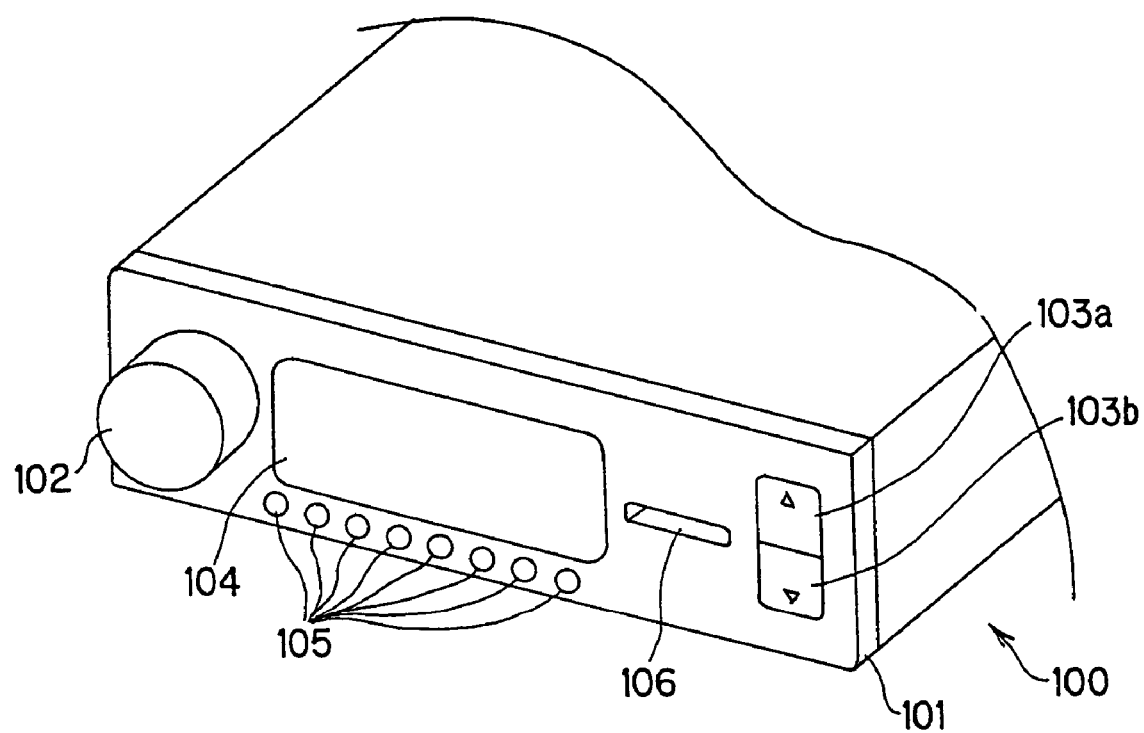
FIG. 9 is a partial perspective view of the conventional electronic equipment.
Figure 10A:
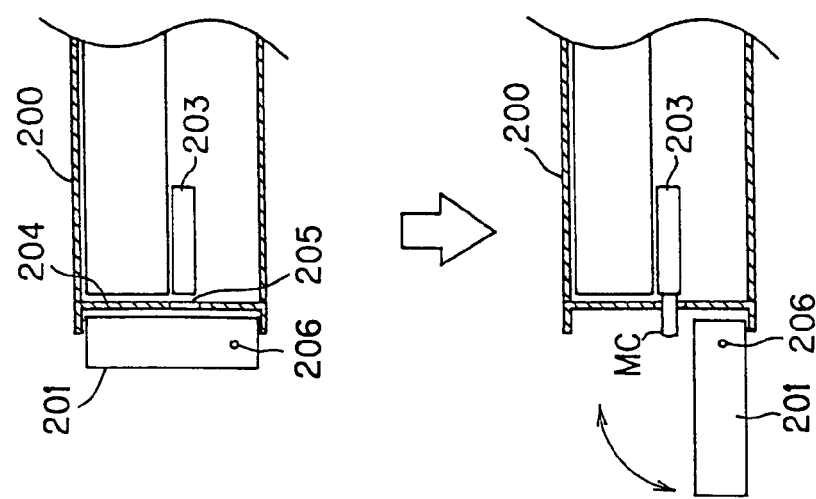
FIG. 10(a) is a cross-sectional view illustrating an opening operation of the front panel of another conventional electronic equipment and FIG. 10(b) is a cross-sectional view illustrating an opening operation of the front panel of further another conventional electronic equipment.
Figure 10B:
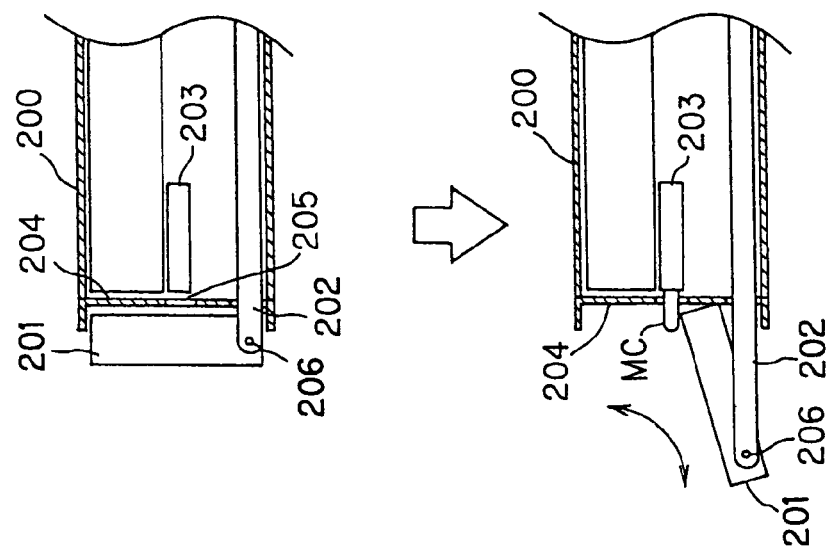

Now, the fifth embodiment of the present invention will be described with reference to FIGS. 7(a) to 8(c). FIG. 7(a) is a partial plan view of the electronic equipment of the fifth embodiment of the present invention, illustrating the front panel, which is kept in the opened position, FIG. 7(b) is a front view of the electronic equipment as shown in FIG. 7(a) and FIG. 7(c) is a sectional view of the electronic equipment as shown in FIG. 7(a). FIG. 8(a) is a perspective view illustrating the recording medium receiving unit of the fifth embodiment of the present invention, FIG. 8(b) is a rear view illustrating the recording medium receiving unit as shown in FIG. 8(a) and FIG. 8(c) is an enlarged view illustrating a locking mechanism for the recording medium receiving unit as shown in FIG. 8(a).

The front panel 3E of the fifth embodiment is provided on its front surface with the same structural components as those of the front panel 3A of the first embodiment. Description of these components is therefore omitted.

In the fifth embodiment, the front panel 3E is movable to swing between the closed position and the opened position in which a rear surface of the front panel 3E faces generally upward, around a pivot shaft 3a provided on a lower side of the front panel 3E as shown in FIG. 7(c) in the same manner as the third embodiment.

When the front panel 3E is kept in the opened position, the slot provided on the inner wall 1a of the casing C is exposed. It is therefore possible to insert an optical disc into the slot.

The recording medium receiving unit 11, which is a card compartment 51 having an insertion hole 43, is mounted in a recess formed on the rear surface of the front panel 3D so as to be swingable around a pivot shaft 42 relative to the front panel 3D on a plane perpendicular to the rear surface of the front panel 3D. The recording medium receiving unit 11 is therefore swingable between a retracted position in which the recording medium receiving unit 11 is completely received in the recess of the front panel 3E, as shown in two-dot chain lines in FIG. 7(b), on the one hand, and a projected and inclined position in which the recording medium receiving unit 11 generally projects from the recess of the front panel 3E so that the insertion hole 43 is exposed above the rear surface of the front panel 3E, as shown in solid lines in the same figure, on the other hand. In such a projected position, the card-type recording medium MC can be loaded into the recording medium receiving unit 11 or unloaded therefrom.

Now, description will be given below of a swing mechanism for swinging the recording medium receiving unit 11 from the retracted position and the projected position with reference to FIGS. 8(a) to 8(c).

The swing mechanism is composed of a pair of supporting arms 52, a pair of base plates 53, a pair of extension coil springs 55, a locking mechanism 57 and a lock releasing mechanism.

The pair of supporting arms 52, which are formed of a metallic plate, are secured on the longitudinally extending opposite sides of the card compartment 51, respectively, so as to be in parallel to each other. The supporting arm 52 has a root end 52b, which projects from the end of the card compartment 51 on the opposite side to the insertion hole 43.

The pair of base plates 53 is formed of a metallic plate so as to serve as a mounting base. Each of the base plate 53 has a slot 53a. The base plates 53 are secured on the bottom of the recess formed on the rear surface of the front panel 3E by means of screws, respectively, so as to be in parallel to each other. The base plate 53 projects upward in a perpendicular direction to the rear surface of the front panel 3E.

The root ends 52b of the supporting arms 52 and the corresponding ends of the base plates 53 are pivotably connected to each other by means of a pair of pivot shafts 42, respectively. The pivot shafts 42 extend in parallel to the rear surface of the front panel 3E so as to be co-axial to each other. Accordingly, the card compartment 51 is swingable in both directions as shown in arrows in FIG. 8(b) on a plane perpendicular to the rear surface of the front panel 3E.

Each of the extension coil springs 55, which is placed in the slot 53a of the base plate 53, has one end 55b that is connected to a spring engaging portion 53b formed on the base plate 53 and the other end 55a that is connected to a spring engaging portion 52d formed on the root end 52b of the supporting arm 52. Such coil springs 55 impart a resilient force to swing the card compartment 51 to the projected position.

The locking mechanism 57 is composed of a lock lever 58, a hook member 56 and a coil spring 60. The lock lever 58, which has an L-shape as shown in FIG. 8(b), is provided at its one end with an engaging pin 58a. The lock lever 58 is pivotably mounted on the inner surface of one of the base plate 53 by means of a supporting pin 59 so that the supporting pin 59 and the above-mentioned engaging pin 58a extend in parallel to the above-mentioned pivot shafts 42. The hook member 56 is formed on the lower and portion of the supporting arm 52 on the opposite side to the root end 52b so as to be capable of engaging with the above-mentioned engaging pin 58a of the lock lever 58. The coil spring 60 is mounted on the lock lever 58 so as to impart a resilient force to turn the lock lever 58 counterclockwise in FIG. 8(b) to the lock lever 58. There is also provided a stopper (not shown) to limit the swing range of the lock lever 58 in the counterclockwise direction mentioned above.

The lock releasing mechanism is composed of a release button 61 and a link mechanism for mechanically connecting the release button 61 to the lock lever 58. The pushing operation of the release button 61 causes the lock lever 58 to turn clockwise in FIG. 8(b) to release the locking condition.

Now, description of operation of the swing mechanism as described above will be given below. When the card-type recording medium MC is loaded, the release button 61 is pushed to swing the card compartment 51 to the projected position under the function of the extension coil springs 55. In such a state, the card-type recording medium MC is inserted into the insertion hole 43 of the card compartment 51 by a manual operation.

Then, when the card compartment 51 is pushed down against the extension coil springs 55 by a manual operation so that it reach the prescribed position, the hook member 56 of the supporting arm 52 comes into contact with the engaging pin 58a of the lock lever 58 to turn the lock lever 58 clockwise in the FIG. 8(b) against the coil spring 60. Continued pushing operation causes the lock lever 58 to turn counterclockwise under the function of the coil spring 60, while engaging the engaging pin 58a of the lock lever 58 with the hook member 56 of the supporting arm 52. Consequently, the card compartment 51 is locked in the retracted position and the loading operation of the card-type recording medium MC is completed in this manner.

When the card-type recording medium MC is unloaded, the release button 61 is pushed to turn the lock lever 58 clockwise in FIG. 8(b) against the coil spring 60 so as to swing the card compartment 51 to the projected position under the function of the extension coil springs 55. In such a state, the card-type recording medium MC can be removed from the insertion hole 43 of the card compartment 51 by a manual operation.

In the fifth embodiment, the recording medium receiving unit 11 is swingable on the plane perpendicular to the rear surface of the front panel 3E. The loading or unloading operation of the card-type recording medium MC can therefore be facilitated. In addition, it is possible to effectively utilize the area of the front panel 3E, permitting use of the recording medium receiving unit 11 having a relatively large size without enlarging the front panel 3E.

In the above-mentioned first to fifth embodiments, the present invention is applied to the electronic equipment serving as the audio device, which is to be mounted to reproduce musical information. The present invention is not limited only to the above-mentioned embodiments, but can be applied to a case where the card-type recording medium MC is used in a navigation system, which is provided on its front side with a movable operation panel such as the front panel as described above.

In addition, the present invention may be applied not only to the electronic equipment to be mounted on the vehicle, but also electronic equipment such as a household audio system, which is provided on its front side with a movable operation panel such as the front panel as described above.

According to the present invention as described in detail, the recording medium receiving unit is concealed and inaccessible in case where the front panel is in the closed position and the recording medium receiving unit is displaced along with movement of the front panel so as to be exposed and accessible in case where the front panel is in the opened position. It is therefore possible to perform easy loading and unloading of a card-type recording medium, reduce the possibility of theft of the card-type recording medium and relieve restriction in design of the front panel.

The entire disclosure of Japanese Patent Application No. 2001-86006 filed on Mar. 23, 2001 including the specification, claims, drawings and summary is incorporated herein by reference in its entirety.

What is claimed is:

1. Electronic equipment, comprising:

a main body;

a first recording medium receiving unit disposed in the main body for receiving a first recording medium, said first recording medium receiving unit having a slot through which the first recording medium is to be loaded or unloaded into or from the first recording medium receiving unit;

a front panel movably connected to the main body between an enabling state, which causes the slot of the first recording medium receiving unit to be exposed to enable the first recording medium to be loaded or unloaded into or from the first recording medium receiving unit, and a disabling state, which causes the slot thereof to be concealed to disable the first recording medium from being loaded or unloaded thereinto or therefrom; and a second recording medium receiving unit disposed in the main body for receiving a second recording medium, the second recording medium receiving unit being movable together with said front panel between an enabling position, which enables the second recording medium to be loaded or unloaded into or from the second recording medium receiving unit, and a disabling position, which disables the second recording medium from being loaded or unloaded thereinto or therefrom, wherein the enabling state is ensured when the second recording medium receiving unit moves to the enabling position together with the front panel, and the disabling state is ensured when the second recording medium receiving unit moves to the disabling position together with the front panel.

2. The electric equipment as claimed in claim 1, wherein the second recording medium receiving unit has a slot through which the second recording medium is to be loaded or unloaded into or from the second recording medium receiving unit, said slot being exposed out of the main body when the second recording medium receiving unit moves to the enabling position together with the front panel.

3. The electric equipment as claimed in claim 2, wherein:

the second recording medium receiving unit is movable between a slot concealing position in which the slot is concealed and a slot exposing position in which the slot is exposed out of the main body, the second recording medium being disabled from being loaded or unloaded into or from the second recording medium receiving unit, when the second recording medium receiving unit is placed in the slot concealing position, and the second recording medium being enabled to be loaded or unloaded thereinto or therefrom, when the second recording medium receiving unit is placed in the slot exposing position.

* * * * *